(12) United States Patent
Chen et al.

(10) Patent No.: US 7,350,091 B2
(45) Date of Patent: Mar. 25, 2008

(54) CONTROL APPARATUS FOR CONTROLLING A PLURALITY OF COMPUTERS

(75) Inventors: Sun-Chung Chen, Taipei Hsien (TW); Hong-Tao Wen, Taipei Hsien (TW)

(73) Assignee: Aten International Co., Ltd., Taipei (TW)

( * ) Notice: Subject to any disclaimer, the term of this patent is extended or adjusted under 35 U.S.C. 154(b) by 400 days.

(21) Appl. No.: 11/121,901

(22) Filed: May 5, 2005

(65) Prior Publication Data
US 2005/0267931 A1    Dec. 1, 2005

(30) Foreign Application Priority Data
May 13, 2004    (TW) ................................ 93113493 A

(51) Int. Cl.
*G06F 1/04*    (2006.01)
*G06F 15/16*    (2006.01)
*G06F 13/42*    (2006.01)
*H04L 5/00*    (2006.01)

(52) U.S. Cl. ...................... 713/375; 713/400

(58) Field of Classification Search ................ 713/310, 713/400, 375
See application file for complete search history.

(56) References Cited

U.S. PATENT DOCUMENTS

| | | | |
|---|---|---|---|
| 6,304,895 B1 * | 10/2001 | Schneider et al. | 709/203 |
| 6,803,951 B1 * | 10/2004 | Matsukawa et al. | 348/231.99 |
| 2003/0135656 A1 * | 7/2003 | Schneider et al. | 709/250 |
| 2003/0222801 A1 | 12/2003 | Ying et al. | |
| 2003/0227929 A1 | 12/2003 | Ambrose | |
| 2004/0015615 A1 | 1/2004 | Liu | |
| 2004/0181590 A1 * | 9/2004 | Liou et al. | 709/217 |
| 2005/0052465 A1 * | 3/2005 | Moore et al. | 345/603 |
| 2005/0114894 A1 * | 5/2005 | Hoerl | 725/74 |
| 2005/0246433 A1 * | 11/2005 | Carrigan et al. | 709/223 |

FOREIGN PATENT DOCUMENTS

| | | |
|---|---|---|
| TW | 522329 | 3/2003 |
| TW | 539173 | 6/2003 |
| TW | 549518 | 8/2003 |

* cited by examiner

*Primary Examiner*—Chun Cao
*Assistant Examiner*—Michael Wang
(74) *Attorney, Agent, or Firm*—Rabin & Berdo, P.C.

(57) ABSTRACT

A control apparatus for controlling a plurality of computers is described. The control apparatus includes a memory, a clock generator, a clock switch circuit, and a main module. The clock switch circuit switches between a system clock and a corresponding clock of a digital video signal. The main module directly stores the digital video signal into the memory according to the corresponding clock through the clock switch circuit. The main module reads the digital video signal from the memory according to the system clock. The main module also receives a remote control signal sent from a remote computer to control the plurality of computers.

36 Claims, 2 Drawing Sheets

US 7,350,091 B2

CONTROL APPARATUS FOR CONTROLLING A PLURALITY OF COMPUTERS

RELATED APPLICATIONS

The present application is based on, and claims priority from, Taiwan Application Serial Number 93113493, filed May 13, 2004, the disclosure of which is hereby incorporated by reference herein in its entirety.

BACKGROUND OF THE INVENTION

1. Field of Invention

The invention relates a control apparatus for controlling a plurality of computers and, in particular, to a control apparatus that controls a plurality of computers through a network.

2. Related Art

A KVM switch refers to a switch that can operate many servers or computers through a set of or many sets of input devices, such as keyboards and mice. With the development of networks, the technique of controlling many servers or computers through a network has become more mature than before. As shown in FIG. 1, a remote computer 100 controls several computers 106 through the network 102, the control apparatus 104 and the KVM switch 108. The remote computer 100 and the control panel 110 can simultaneously control or optionally control the computers 106. The action of the control apparatus 104 is performed after the remote control signal sent out by the remote computer is decoded and transmitted to the computers 106. The control screen is also sent to the remote computer 100 through the control apparatus 104 and the network 102.

The KVM Over IP has its debut in 1999. Most of the original designs collect the RGB signals and keyboard/mouse signals from local computers or the KVM switch using a collector. Afterwards, data conversion and filter processing are performed. After the compression by a compressing chip or computer, the data travel through a local area network (LAN) or wide area network (WAN) to exchange with the remote computer, thus implementing a networking or digitized KVM.

Such techniques usually use computers as the carrier. An application specific standard product (ASSP) is further needed and connected to the computer through a computer interface (e.g. a PCI interface). This design relies the computer to complete the major or most of the processing. Therefore, a corresponding program has to be coded for different operating systems. This makes the computer interface design complicated and renders a higher cost. The KVM Over IP system implemented in this way will become very huge.

Traditionally, the design of separate keyboard/mouse and image processor also increases the cost. Besides, it will be very inconvenient if the keyboard/mouse controller at the near end does not synchronize with the keyboard/mouse controller at the far end, or there is even no local keyboard/mouse controller.

In addition, the traditional way of processing image signals is to transmit data collected by an analog-to-digital converter (ADC) to a memory (usually called a frame buffer), such as SDRAM, DDR, or FIFO. However, the image or video signals usually involve a huge amount of data, converting an RGB signal by the ADC into 15 bits will occupy 30 general-purpose inputs/outputs (GPIO) using a single channel communication to the memory through the field programmable gate array (FPGA) or 60 GPIO's using double channels. This method complicates the circuit design. The wiring on the circuit board is also more complicated, increasing the chip cost. Using too many GPIO's will slow down the chip speed. When sampling and processing image signals at high speeds, the chip is required to be very good. This inevitably increases the cost.

For example, in U.S. Pat. No. 6,304,895, the output of the ADC is received by an FPGA for further output to the SDRAM. The FPGA will use too many GPIO's. Besides, this patent is implemented using a PCI interface. This will result in an over-complicated system that is hard to design.

Therefore, how to provide a controller that does not rely on computer interfaces, reduce the use of GPIO's, and directly process input devices for controlling several computers is a very important issue in the industry.

SUMMARY OF THE INVENTION

An object of the invention is to provide a control apparatus for a remote computer to control a plurality of computers through a network. The control apparatus can directly collect analog image signals and output to a memory, reducing the use of the GPIO's of the main module.

Another object of the invention is to provide a controller device for a remote computer to control a plurality of computers through a network. The control apparatus does not rely on the computer structure and can work without using the computer standard interfaces.

A further object of the invention is to provide a controller device for a remote computer to control a plurality of computers through a network. The main module of the control apparatus directly receives the local control signals from the input devices to achieve a high integration and a lower cost.

In accord with the above objects, a control apparatus is provided to control a plurality of computers. According to a preferred embodiment of the invention, the control apparatus includes a memory, a clock generator, a clock switch circuit, and a main module. The clock generator generates a system clock. The clock switch circuit is used to switch between the system clock and a pixel clock of a digital image signal. The main module uses the clock switch circuit to directly store the digital image signals using this pixel clock in the memory. The main module uses the clock switch circuit to read the digital image signals stored in the memory according to the system clock. The loaded digital image signals are then transmitted to a remote computer through a network. The main module receives a remote control signal sent out from the remote computer to control many computers. The clock switch circuit contains a phase lock loop (PLL) to lock the pixel clock of the digital image signals.

The control apparatus contains an input device connected to the main module. The input device sends out a local control signal to control the computers through the main module. The control apparatus can control the computers through a KVM switch. The control apparatus may contain an ADC to receive an analog image signal and convert it to a corresponding digital image signal. The analog image signal is a screen image signal of a local computer or a computer. The main module can be a programmable element, such as a FPGA or a digital signal processor (DSP). The main module may be an application specific integrated circuit (ASIC) too.

In summary, the disclosed main module uses the clock switch circuit to directly store the digital image signal in the memory using the pixel clock. Therefore, the control apparatus can directly collect the analog image signal and avoid passing the GPIO's of the main module. The control apparatus does not rely on the computer structure and can work without using the computer standard interfaces. Since the control apparatus has a clock switch circuit, it can accurately switch between the system clock and the pixel clock of the digital image signal, for the convenience of controlling the memory. The main module of the control apparatus directly receives the local control signal from the input device to achieve a high integration and a lower cost.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

Figure 1:
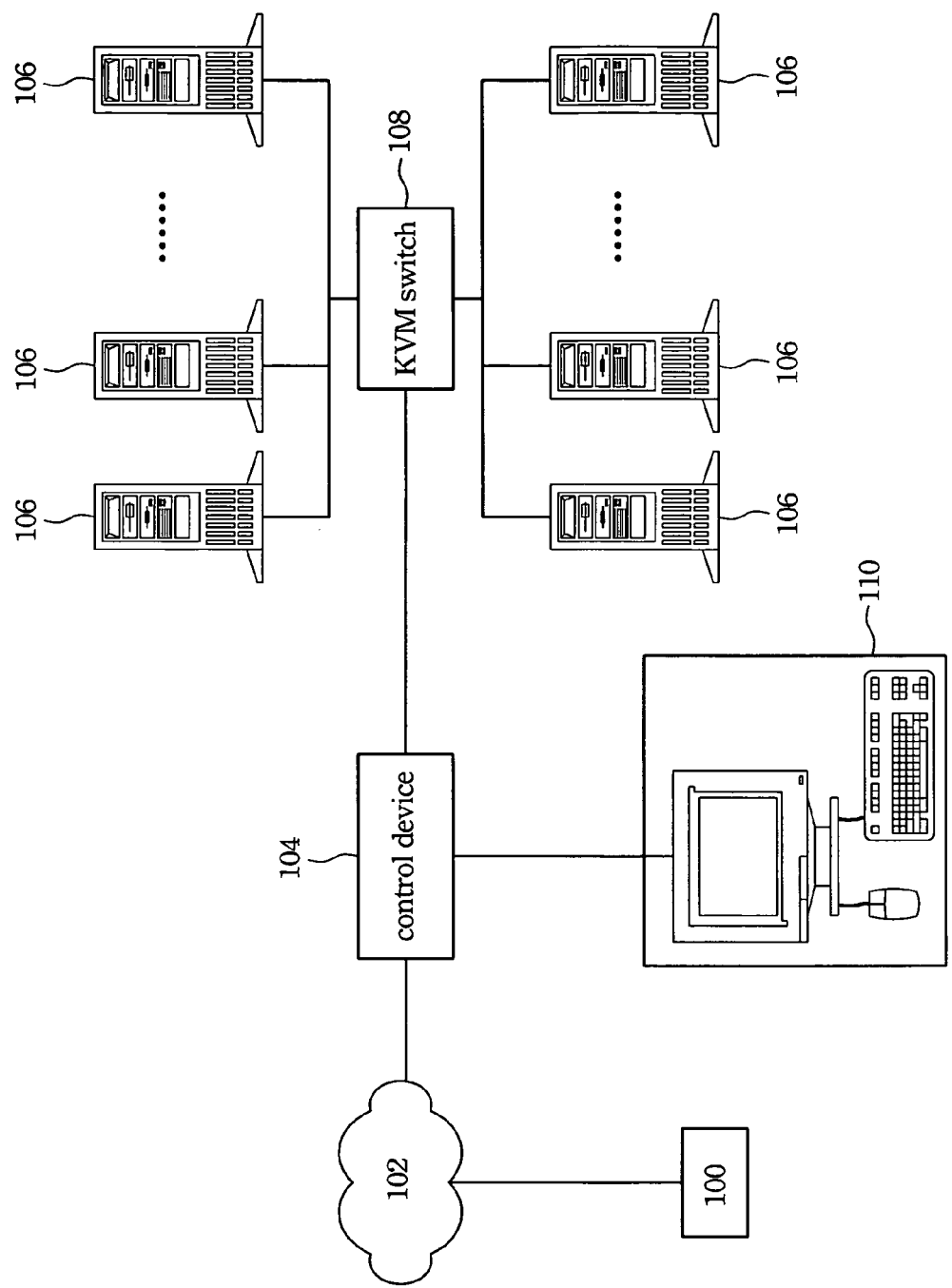
FIG. 1 illustrates a system structure of controlling several computers through a network.
Figure 2:
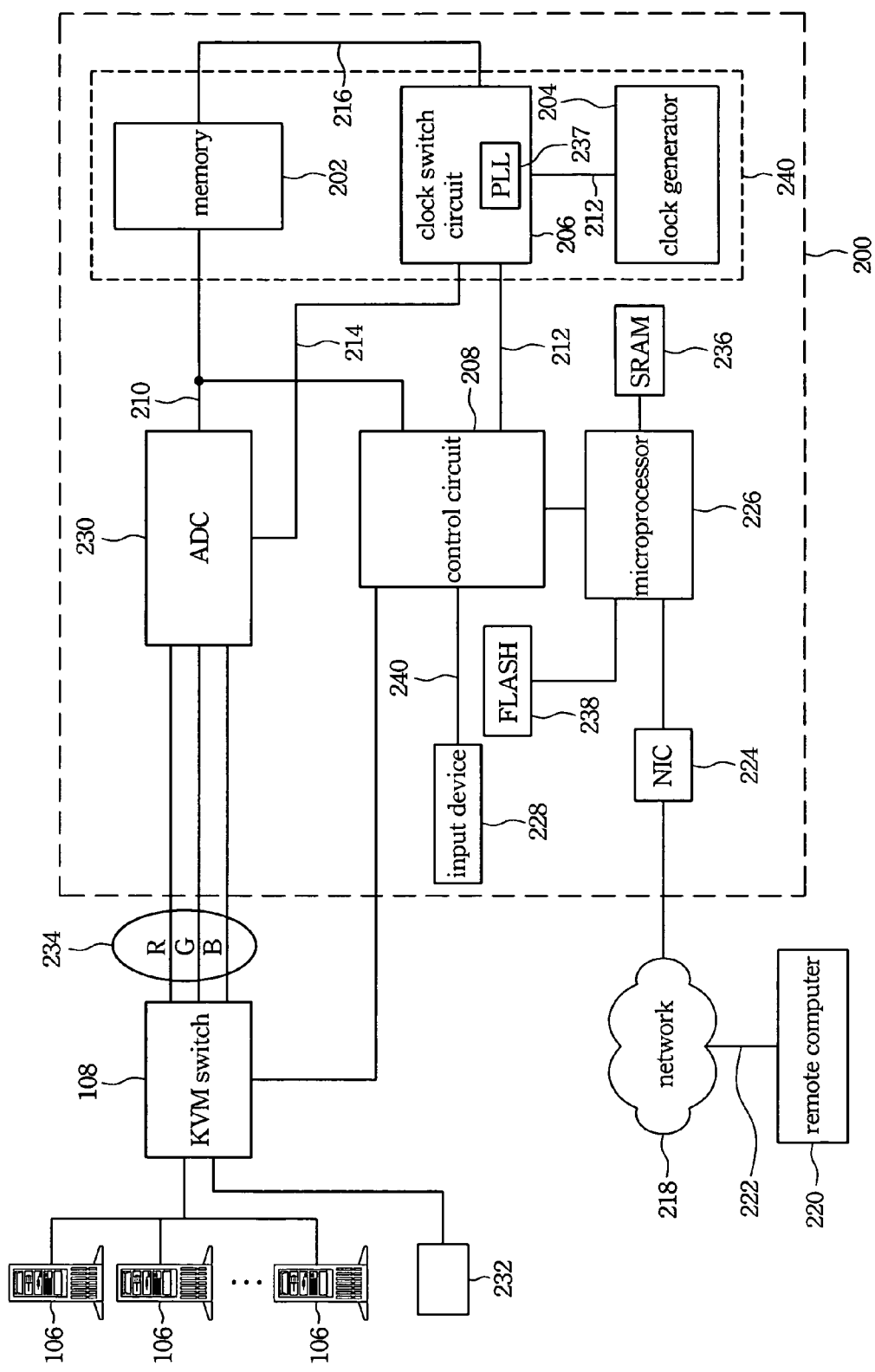
FIG. 2 is a block diagram of a preferred embodiment of the invention.

With reference to FIG. 2, the control apparatus 200 can be used as the control apparatus 104 in FIG. 1 for controlling several computers 106. The control apparatus 200 includes a memory 202, a clock generator 204, a clock switch circuit 206, and a main module 208. The clock generator 204 generates a system clock 212. The clock switch circuit 206 provides a pixel clock for switching between the system clock 212 and a digital image signal 210. The pixel clock is generated after the PLL 237 locks the phase of the synchronization signal 214. The clock switch circuit 206 selects one of the system clock 212 and the pixel clock as a memory clock 216 for the memory 202 to use.

The main module 208 uses the clock switch circuit 206 to directly store the digital image signal 210 in the memory 202 using the pixel clock. The main module 208 uses the clock switch circuit 206 to read out the digital image signal 210 from the memory 202 and to send the digital image signal 210 to a remote computer 220 through the network 218. The main module 208 receives a remote control signal 222 from the remote computer 220 through the network 218 to control the computers 106.

With simultaneous reference to FIGS. 1 and 2, the computers 106 are connected through a KVM switch 108 to the control apparatus 200. The remote control signal 222 sent by the remote computer 220 travels through the network 218. It is received by a network interface controller 224 and further transmitted by a microprocessor 226 to the main module 208. The main module 208 transmits the remote control signal 222 through the KVM switch 108 to the computers 106 to control them.

The input device 228 is directly coupled to the main module 208. The remote control signal 222 sent from the remote computer 220 and the local control signal 240 sent from the input device 228 can simultaneously or optionally control the computers 106. The input device 228 can be a keyboard or a mouse.

The ADC 230 is connected to the computers 106 and the local computer 232 through the KVM switch 108. The control apparatus 200 uses the ADC 230 to receive the analog image signal 234 and sends it to the remote computer 220 through the network 218. The analog image signal 234 represents a control screen or screen image signal of a computer 106 or a local computer 232. In another embodiment, the ADC 230 can support a DVI (digital visual interface) signal and converts it into a digital image signal 210. Therefore, the remote computer 220 can see the control screen or screen image signal of the computer 106 or the local computer 232 through the network 218.

The analog image signal 234 is converted by the ADC 230 into a digital image signal 210. The digital image signal 210 is directly sent to the memory 202 without passing the main module 208. The clock switch circuit 206 uses a PLL 237 to lock the synchronization signal 214 of the digital image signal 210 for generating the pixel clock. Thus, the memory clock 216 is in phase with the pixel clock. The digital image signal 210 can be correctly stored in the memory 202.

When the main module 208 needs to read out the digital image signal 210, the main module 208 uses the clock switch circuit 206 to switch the memory clock 216 to the system clock 212, so that the main module 208 can read out the digital image signal according to the system clock 212. The signal collecting module 240 includes the clock switch circuit 206 and the clock generator 204 for direct collection of the analog image signal 234 and storing it to the memory 202.

The advantage of doing so is that the digital image signal 210 is directly stored in the memory 202 without going through the main module 208. This can reduce the usage of GPIO's in the main module 208, thus accelerating the processing speed of the main module 208. Since the amount image or video signal data is usually very huge, 30 or 60 GPIO's are required if the main module 208 is connected to the memory 202 through, respectively, a single or double channels in the traditional way, assuming that the RGB signal is converted by the ADC into 15 bits. This traditional method complicates the circuit design, the wiring, and the chip cost. Using too many GPIO's will slow down the chip speed. Therefore, the cost will increase when the image signal is sampled and processed at high speeds due to the demand for a better chip.

Traditionally, the input device 228 (keyboard/mouse) and the image processor are designed to be separate. This also increases the cost. If the local keyboard/mouse controller is not synchronized with the remote keyboard/mouse controller or there is no local keyboard/mouse controller at all, it will be extremely inconvenient in use. In this embodiment, the input device 228 is directly coupled to the main module 208. The main module 208 can directly process the local control signal 240 without using the KVM switch 108. This is a very convenient and efficient design. The analog image signal 234 of the input control apparatus 200 can be a control screen or screen image signal from a local computer 232, no necessarily from the KVM switch.

The main module 208 can be a programmable device, such as an FPGA. The main module 208 can also be an ASIC or a DSP. A preferred working frequency range of the main module 208 is between 25 MHz and 200 MHz. The memory 202 can be an SDRAM. The microprocessor 226 provides interface processing for the memory 202, network 218, FLASH 238, SRAM 236, and GPIO's. A preferred working frequency range of the microprocessor 226 is between 100 MHz and 500 MHz. A preferred working frequency range of the clock generator 204 is between 40 MHz and 150 MHz. The SRAM 236 contains program codes, program data, and data defined by the user. The FLASH 238 contains program codes and system settings for the microprocessor 226 to control the whole system.

The synchronization signal 214 comes from, for example, HSYNC. When the PLL 237 locks in the synchronization signal 214, a pixel clock is generated as the memory clock 216 for the memory 202. The main module 208 uses this pixel clock to correctly record the analog image signal 234 in the memory 202. The analog image signal 234 can be, for example, an RGB analog image signal for normal displays.

The main module 208 provides a communication interface for the keyboard/mouse and image sampling. It can be used to decode the commands from the microprocessor 226 and send them to the computer 106. The main module 208 independently completes the keyboard/mouse processing of the local computer 232 and the remote computer 226 to reduce the burden of the microprocessor 226. The main module 208 also controls the memory 202 to coordinate the time-ordering of signal processing.

The microprocessor 226 and the clock switch circuit 206 can be selectively built in the main module 208. The usual DSP built in with a microprocessor has very powerful internal and external interfaces. It can be easily connected to standard external devices, such as the UART, PCI, PCM-CIA, MAC, SDRAM, AUDIO, and LCD interfaces for the convenience of the system extensions. This can readily implement Serial Over IP and Audio Over IP.

In this embodiment, the main module 208 directly receives and processes signals from the input device 228 (keyboard/mouse) in order to achieve higher integration and lower cost. The input device 228 (keyboard/mouse) adopts a gapless design so that no data will be lost between the remote and local input devices 228 (keyboard/mouse), rendering the desired synchronization.

Most of the ADC's for image processing on the market have the function of having a high resistance on the output device. Therefore, the output of the ADC 230 can be directly coupled to the memory 202 and the main module 208 in design. When sampling the analog image signal 234, the output of the main module 208 coupled to the memory 202 is set with a high resistance for the digital image signal 210 to be stored in the memory 202. When the main module 208 needs to read out the digital image signal 210, the output of the ADC 230 is set with a high resistance for the main module 208 to read out the digital image signal 210 in the memory 202. The above-mentioned digital image signal 210 and the analog image signal 234 can be substituted by a digital video signal 210 and an analog video signal 234, respectively.

In this embodiment, the clock switch circuit 206 with the PLL 237 can accurately and effectively switch between the pixel clock of the ADC 230 and the system clock 212. The clock switch circuit 206 with the PLL 237 (e.g. DCM, PLL, or DLL) can be integrated inside the main module 208.

In summary, the main module 208 uses the clock switch circuit 206 to directly store the digital image signal in the memory 202 using the pixel clock. Therefore, the control apparatus 200 can directly clock the analog image signal 234 and avoid passing through the GPIO's of the main module 208. The control apparatus 200 can work without relying on the computer structure and without going through any standard computer interface (e.g. the PCI interface). Since the control apparatus 200 has a clock switch circuit 206, the system clock 212 and the pixel clock of the digital image signal 210 can be accurately switched for the convenience of memory control. The main module 208 of the control apparatus 200 directly receives the local control signal 240 of the input device 228 to achieve higher integration and lower cost.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A control apparatus for controlling a plurality of computers, comprising:
    a memory coupled to directly receive a digital image signal, the memory receiving a memory clock;
    a clock generator, which generates a system clock;
    a clock switch circuit coupled to receive the system clock and a synchronization signal of the digital image signal, the clock switch circuit generating a pixel clock based on the synchronization signal of the digital image signal and switching between the system clock and the pixel clock for generating the memory clock; and
    a main module coupled to the memory and the clock switch circuit, the main module causing the clock switch circuit to switch the memory clock between the pixel clock and the system clock, wherein the memory stores the directly received digital image signal when the clock switch circuit switches the memory clock to the pixel clock, and wherein the main module reads out stored digital image signal from the memory when the clock switch circuit switches the memory clock to the system clock, the main module sending the digital image signal read from the memory to a remote computer.

2. The control apparatus of claim 1, wherein the main module receives a remote control signal sent from the remote computer to control the computers.

3. The control apparatus of claim 2 further comprising a microprocessor for receiving the remote control signal and sending it to the main module.

4. The control apparatus of claim 1 further comprising an input device coupled to the main module, wherein the input device sends out a local control signal to control the computers through the main module.

5. The control apparatus of claim 4, wherein the input device includes a mouse and a keyboard.

6. The control apparatus of claim 1, wherein the control apparatus controls the computers through a KVM switch.

7. The control apparatus of claim 1 further comprising an analog-to-digital converter (ADC) for receiving an analog image signal and converting it into the digital image signal.

8. The control apparatus of claim 7, wherein the ADC supports the function of receiving a digital visual interface (DVI) signal and converting it into the digital image signal.

9. The control apparatus of claim 7, wherein the analog image signal is a screen image signal of a local computer.

10. The control apparatus of claim 7, wherein the analog image signal is a screen image signal of one of the computers.

11. The control apparatus of claim 1, wherein the main module is a programmable device.

12. The control apparatus of claim 11, wherein the programmable device is an FPGA.

13. The control apparatus of claim 1, wherein the main module is a DSP.

14. The control apparatus of claim 1, wherein the main module is an application specific integrated circuit (ASIC).

15. The control apparatus of claim 1, wherein the clock switch circuit further contains a phase lock loop (PLL) for locking the pixel clock of the digital image signal.

16. A control apparatus for connecting to an input device and a plurality of computers, the control apparatus comprising:
- a programmable device receiving a remote control signal from a remote computer through a network and controlling the computers according to the remote control signal, wherein when the programmable device does not receive any remote control signal, the programmable device controls the computers according to a local control signal from the input device;
- a memory receiving a memory clock; and
- a clock switch circuit generating a pixel clock by locking a synchronization signal of a digital image signal, wherein the clock switch circuit switches between a system clock and the pixel clock, wherein the memory clock is in phase with the pixel clock; wherein the digital image signal is directly stored in the memory when the memory clock is switched to the pixel clock; and wherein the digital image signal is read by the programmable device from the memory when the memory clock is switched to the system clock.

17. The control apparatus of claim 16, wherein the clock switch circuit further includes a PLL for locking in the pixel clock of the digital image signal.

18. The control apparatus of claim 16, wherein the programmable device sends the digital image signal to the remote computer through the network.

19. The control apparatus of claim 16 further comprising an ADC for receiving an analog image signal and converting it into the digital image signal.

20. The control apparatus of claim 19, wherein the ADC supports the function of receiving a DVI signal and converting it into the digital image signal.

21. The control apparatus of claim 20, wherein the analog image signal is a screen image signal of a local computer.

22. The control apparatus of claim 20, wherein the analog image signal is a screen image signal of one of the computers.

23. The control apparatus of claim 16, wherein the control apparatus controls the computers through a KVM switch.

24. The control apparatus of claim 16, further comprising a microprocessor for receiving the remote control signal and sending it to the programmable device.

25. The control apparatus of claim 16, wherein the input device includes a mouse and a keyboard.

26. The control apparatus of claim 16, wherein the programmable device is an FPGA.

27. A signal collecting module, comprising:
- a memory coupled to directly receive a digital image signal, the memory receiving a memory clock;
- a clock generator, which generates a system clock; and
- a clock switch circuit coupled to receive the system clock and a synchronization signal of the digital image signal, the clock switch circuit generating a pixel clock based on the synchronization signal of the digital image signal and switching the memory clock to the pixel clock when storing the digital image signal directly in the memory and switching the memory clock to the system clock when reading out the digital image signal stored in the memory.

28. The module of claim 27, wherein the clock switch circuit further contains a PLL for locking in the pixel clock of the digital image signal.

29. The module of claim 27 further comprising an ADC for receiving an analog image signal and converting it into the digital image signal.

30. The module of claim 29, wherein the ADC supports the function of receiving a DVI signal and converting it into the digital image signal.

31. The module of claim 27, wherein the main module is a programmable device.

32. The module of claim 27, wherein the programmable device is an FPGA.

33. The module of claim 27, wherein the main module is a DSP.

34. The module of claim 27, wherein the main module is an ASIC.

35. The control apparatus of claim 2, wherein the remote control signal is entered through a network interface controller to the main module.

36. The control apparatus of claim 1, wherein the main module sends the digital image signal to the remote computer through a network.

* * * * *